(12) United States Patent
Alvarez Flores

(10) Patent No.: US 11,937,165 B1
(45) Date of Patent: Mar. 19, 2024

(54) SYSTEMS AND METHODS OF SELECTIVELY ROUTING A PACKET FLOW

(71) Applicant: Stackshare Technologies LLC, Watertown, NC (US)

(72) Inventor: Emilio Alvarez Flores, Durham, NC (US)

( * ) Notice: Subject to any disclaimer, the term of this patent is extended or adjusted under 35 U.S.C. 154(b) by 0 days.

(21) Appl. No.: 18/372,912

(22) Filed: Sep. 26, 2023

Related U.S. Application Data

(60) Provisional application No. 63/410,277, filed on Sep. 27, 2022.

(51) Int. Cl.
*H04W 40/12* (2009.01)
*H04W 40/22* (2009.01)

(52) U.S. Cl.
CPC .......... *H04W 40/12* (2013.01); *H04W 40/22* (2013.01)

(58) Field of Classification Search
None
See application file for complete search history.

(56) References Cited

U.S. PATENT DOCUMENTS

| | | | |
|---|---|---|---|
| 9,661,080 | B2 | 5/2017 | Haleem et al. |
| 10,064,096 | B2 | 8/2018 | Lee et al. |
| 10,104,239 | B2 * | 10/2018 | Gupta ................. G08B 25/016 |
| 10,362,116 | B2 | 7/2019 | Haleem et al. |
| 10,412,171 | B2 | 9/2019 | Haleem et al. |
| 10,833,975 | B2 | 11/2020 | Pignataro et al. |
| 10,917,810 | B2 * | 2/2021 | Jun ....................... H04W 28/10 |
| 10,939,405 | B1 | 3/2021 | Haleem et al. |
| 11,038,964 | B2 | 6/2021 | Haleem et al. |
| 11,838,114 | B2 * | 12/2023 | Jeong .................... H04W 48/18 |
| 2002/0136226 | A1 | 9/2002 | Christoffel et al. |

(Continued)

FOREIGN PATENT DOCUMENTS

| CN | 106302168 A | 1/2017 |
|---|---|---|
| CN | 111162922 A | 5/2020 |

(Continued)

OTHER PUBLICATIONS

Software defined Networking (SDN), GeeksforGeeks, https://www.geeksforgeeks.org/software-defined-networking/, Sanchhaya Education Private Limited, Noida, India.

(Continued)

*Primary Examiner* — Brian S Roberts
(74) *Attorney, Agent, or Firm* — Kaufman & Canoles, P.C.

(57) ABSTRACT

Systems and methods of selectively routing a packet flow are provided. In one exemplary embodiment, a method is performed by a first network node associated with a first network and operable to selectively route packet flows between the first network and a second network over first and second access nodes associated with corresponding first and second access networks. The method includes contemporaneously routing both a first packet flow through the first access node and a second packet flow through the second access node based on a network metric associated with the first or second access network, a user or device activity preference associated with the first network and a user or device activity associated with the first or second packet flow. Further, each access networks is operable to enable the first network node to access the second network over the corresponding access node.

20 Claims, 10 Drawing Sheets

(56) References Cited

U.S. PATENT DOCUMENTS

| | | | |
|---|---|---|---|
| 2006/0029035 A1 | 2/2006 | Chase et al. | |
| 2008/0008196 A1 | 1/2008 | Hong | |
| 2011/0103330 A1 | 5/2011 | Montojo et al. | |
| 2011/0173616 A1 | 7/2011 | Lattmann et al. | |
| 2014/0211705 A1* | 7/2014 | Baek | H04W 76/14 370/329 |
| 2015/0119035 A1 | 4/2015 | Ganu et al. | |
| 2018/0368047 A1* | 12/2018 | Patil | H04L 45/245 |
| 2020/0396668 A1* | 12/2020 | Muscariello | H04L 1/0017 |
| 2021/0075692 A1* | 3/2021 | Patil | H04W 76/12 |
| 2021/0111990 A1 | 4/2021 | Nainar et al. | |
| 2021/0204164 A1* | 7/2021 | Yavuz | H04L 47/781 |
| 2021/0281994 A1 | 9/2021 | Stammers et al. | |
| 2023/0224207 A1 | 7/2023 | Morris | |

FOREIGN PATENT DOCUMENTS

| | | |
|---|---|---|
| EP | 1699247 A1 | 9/2006 |
| EP | 2495940 A1 | 9/2012 |
| EP | 3487088 A1 | 5/2019 |
| WO | 03047252 A1 | 6/2003 |
| WO | 2004030306 A1 | 4/2004 |

OTHER PUBLICATIONS

Software defined Networking (SDN), GeeksforGeeks, https://www.geeksforgeeks.org/software-defined-networking-sdn-controller/, Sanchhaya Education Private Limited, Noida, India.

Barb, Gordana, et al., Digital Beamforming Techniques for Future Communications Systems, 2020 12th International Symposium on Communication Systems, Networks and Digital Signal Processing (CSNDSP), Jul. 20-22, 2020, Porto, Portugal.

Sheldon, Robert, Multiplexing, Aug. 25, 2021, Tech Target Network, https://www.techtarget.com/searchnetworking/definition/multiplexing.

Webster, Eva, MIMO (multiple input, multiple output), Mar. 25, 2021, Tech Target Network, https://www.techtarget.com/searchmobilecomputing/definition/MIMO.

Traffic distribution in heterogenous network environment, Oct. 29, 2014, https://bit.ly/3KXnWQN, Justia Patents.

Heterogenous Network Interworking Method of a Node Having Multiple Network Interfaces, Oct. 12, 2005, https://bit.ly/3Qtgf64, Justia Patents.

Spectrum Interpretation in a Heterogenous Network, Nov. 1, 2010, https://bit.ly/3RtQgNd, Justia Patents.

System, Apparatus and Method for Managing Network Device Connectivity on Heterogenous Networks, Oct. 28, 2023, https://bit.ly/3QxbCb3, Justia Patents.

Methods and systems for enabling seamless roaming of mobile devices among wireless networks, Jan. 23, 2002, https://bit.ly/3xcGEOB, Justia Patents.

Operations processing of multiple-protocol packets by packet switching devices in a network, Dec. 21, 2018, https://bit.ly/3RLHGJT, Justia Patents.

Systems and Methods for Providing Multiple Disjointed Paths to Core Network, Oct. 14, 2019, https://bit.ly/3x9bdEO, Justia Patents.

Roaming Among Different Types of Networks, Jul. 21, 2020, https://bit.ly/3RNUTBd, Justia Patents.

Patents Assigned to Helium Systems, Inc., https://patents.justia.com/assignee/helium-systems-inc, Justia Patents.

\* cited by examiner

400c

```
BY AN ACCESS NODE ASSOCIATED WITH A FIRST ACCESS NETWORK AND OPERABLE
TO ROUTE PACKETS BETWEEN FIRST AND SECOND NETWORKS OVER A FIRST
NETWORK NODE ASSOCIATED WITH THE FIRST NETWORK, ROUTE A PACKET FLOW
BETWEEN THE FIRST AND SECOND NETWORKS OVER THE FIRST ACCESS NETWORK,
WITH THE FIRST NETWORK NODE BEING OPERABLE TO SELECTIVELY ROUTE DATA
PACKETS BETWEEN THE FIRST AND SECOND NETWORKS OVER THE ACCESS NODE
ASSOCIATED WITH THE FIRST ACCESS NETWORK AND AN ACCESS NODE ASSOCIATED
WITH A SECOND ACCESS NETWORK, EACH ACCESS NETWORK BEING OPERABLE TO
ENABLE THE FIRST NETWORK NODE TO ACCESS THE SECOND NETWORK OVER THE
CORRESPONDING ACCESS NODE
```
— 401c

```
BY A NETWORK NODE ASSOCIATED WITH A FIRST OR SECOND ACCESS NETWORK,
SEND, TO A NETWORK NODE ASSOCIATED WITH A SECOND NETWORK, AN INDICATION
OF A NETWORK CHARACTERISTIC ASSOCIATED WITH THE FIRST OR SECOND ACCESS
NETWORK, EACH ACCESS NETWORK BEING OPERABLE TO ENABLE A FIRST NETWORK
NODE ASSOCIATED WITH A FIRST NETWORK TO ACCESS THE SECOND NETWORK OVER
A CORRESPONDING ACCESS NODE OF THE FIRST AND SECOND ACCESS NETWORKS
```
— 401d

SYSTEMS AND METHODS OF SELECTIVELY ROUTING A PACKET FLOW

CROSS REFERENCE TO RELATED APPLICATIONS

The present application claims the benefit of U.S. Provisional App. No. 63/410,277, filed Sep. 27, 2022, which is hereby incorporated by reference in its entirety.

FIELD OF DISCLOSURE

The present disclosure relates generally to the field of network communications, and in particular to selectively routing a packet flow.

BACKGROUND

Some wireless devices (e.g., smartphone, mobile phone) have the ability to move among different types of wireless communication networks such as between a wireless local area network (e.g., WiFi, Bluetooth) and a mobile telecommunications network (e.g., cellular network, satellite network). As such, a wireless device can include various wireless transceivers that enable the wireless device to communicate over different types of wireless networks. When a wireless device moves to access a different type of wireless network, the communication session with the current wireless network terminates and the wireless device must establish a new communication session with the newly accessed wireless network. In conventional approaches, wireless devices have difficulties seamlessly roaming among wireless networks as the communication session with the current wireless network must be terminated before the wireless device can access and establish a communication session with the new wireless network. Further, a wireless device should be able to move freely from location to location independent of the type of wireless networks. Also, routers and gateways should be able to handle wireless devices that move their connections between wireless access points, from public to private wireless networks, or between different types of wireless networks. Wireless networks that wireless devices can roam between can be characterized as homogenous wireless networks or heterogeneous wireless networks, based on whether they practice the same wireless communications protocols for communicating with roaming wireless devices. A wireless device roaming between homogenous wireless networks can use a single wireless transceiver that supports the same wireless communications protocol as the wireless homogenous networks. However, a wireless device roaming between heterogeneous wireless networks requires multiple wireless transceivers, with each transceiver supporting the same wireless communications protocol as the corresponding wireless heterogenous network.

BRIEF DESCRIPTION OF THE DRAWINGS

The present disclosure will now be described more fully hereinafter with reference to the accompanying drawings, in which embodiments of the disclosure are shown. However, this disclosure should not be construed as limited to the embodiments set forth herein. Rather, these embodiments are provided so that this disclosure will be thorough and complete, and will fully convey the scope of the disclosure to those skilled in the art. Like numbers refer to like elements throughout.

FIGS. 4A-D illustrate embodiments of a method performed by a network node of selectively routing a packet flow in accordance with various aspects as described herein.

DETAILED DESCRIPTION

For simplicity and illustrative purposes, the present disclosure is described by referring mainly to an exemplary embodiment thereof. In the following description, numerous specific details are set forth in order to provide a thorough understanding of the present disclosure. However, it will be readily apparent to one of ordinary skill in the art that the present disclosure may be practiced without limitation to these specific details.

In this disclosure, systems and methods of selectively routing a packet flow are provided. In one exemplary embodiment, a router associated with a wired or wireless local area network (LAN) is operable to selectively route packet flows between the LAN and the Internet over different wireless networks such as a cellular network, a satellite network, a cable network, an optical fiber network, a WiFi network, a LoRa network, the like, or any combination thereof. The router can contemporaneously route both a first packet flow over the a first access network (e.g., cellular) and a second packet flow over a second access network (e.g., satellite network) to access the Internet based on network metrics (e.g., network bandwidth, latency, packet loss, throughput) associated with the first or second network, a user activity preference (e.g., streaming video, video communications, gaming), or user or device activity (e.g., streaming video, video communications, gaming) associated with the first or second packet flows.

Figure 1A:
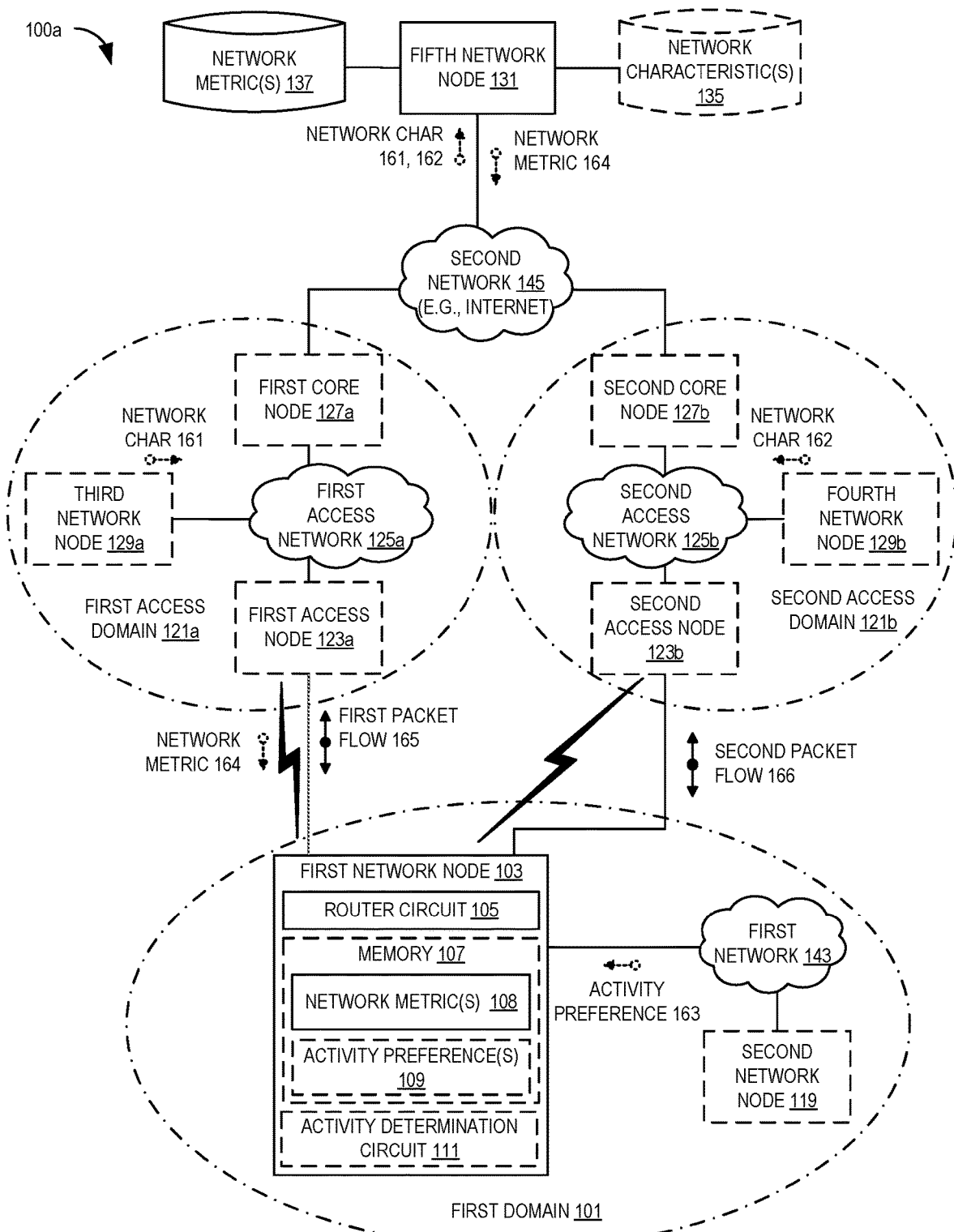
FIGS. 1A-B illustrate one embodiment of a system of selectively routing a packet flow in accordance with various aspects as described herein.
Figure 1B:
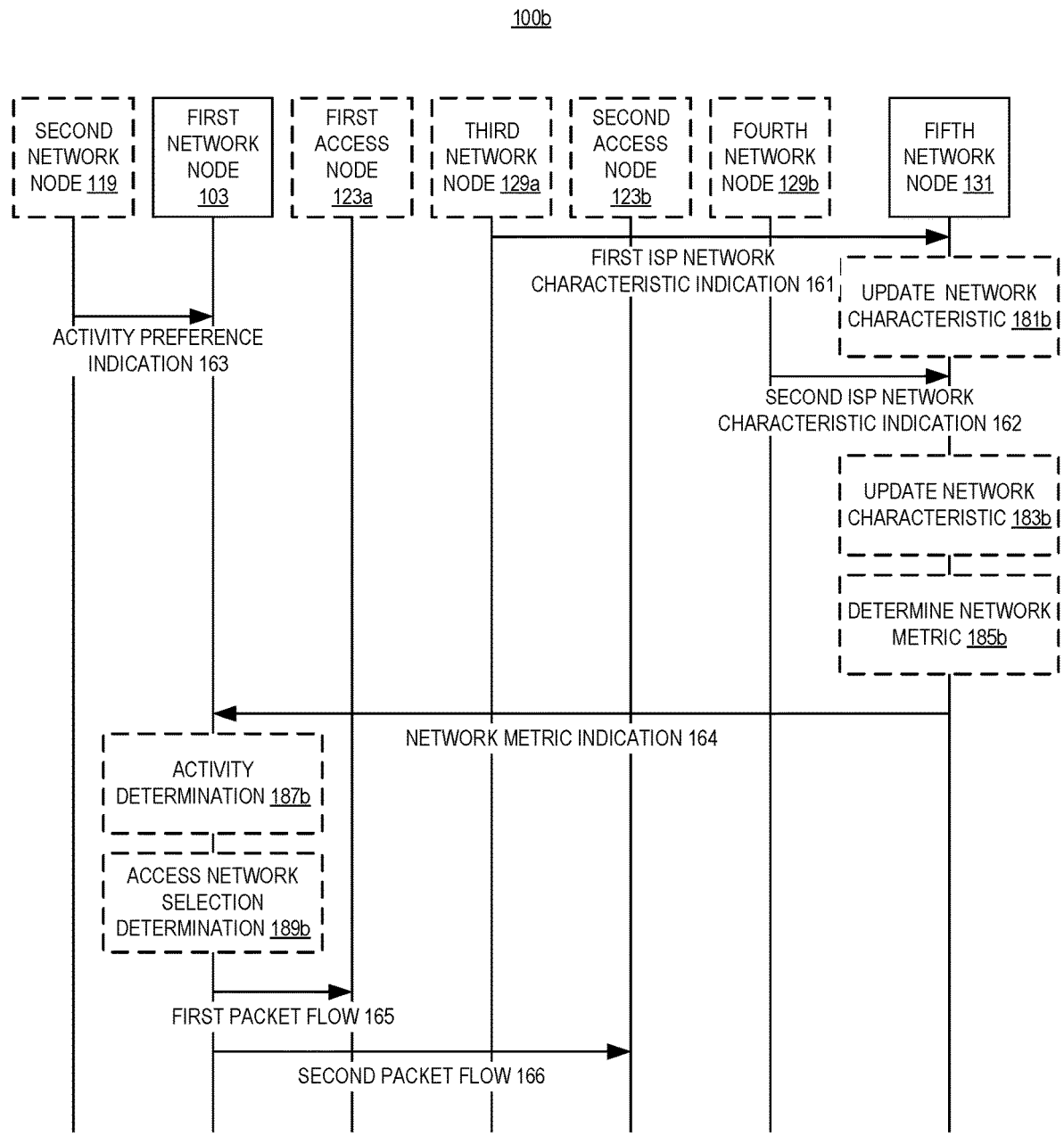

FIGS. 1A-B illustrate one embodiment of a system 100a-b of selectively routing a packet flow 165, 166 in accordance with various aspects as described herein. In FIGS. 1A-B, the system 100a-b can include a first network domain 101 (e.g., local area network (LAN), wireless LAN (WLAN), ad hoc network, peer-to-peer network) having a first network node 103 (e.g., wired or wireless device, edge router) coupled to a second network node 119 (e.g., wired or wireless device) over a first network 143 (e.g., WiFi, Bluetooth, nearfield, cellular, satellite, ethernet, cable, fiber, USB). In some instances, a network node may be referred as a network equipment, a user equipment (UE), an access point (AP), a mobile station (MS), a terminal, a cellular phone, a cellular handset, a personal digital assistant (PDA), a smartphone, a wireless phone, a hotspot, an organizer, a handheld computer, a desktop computer, a laptop computer, a tablet computer, a router, a switch, a set-top box, a television, an appliance, a server, a game device, a medical device, a display device, a metering device, or some other like terminology. Further, the system 100a-b includes first and second access domains 121a-b (e.g., access provider, ad hoc network, peer-to-peer network) with each domain enabling access to a second network 145 (e.g., Internet). An access provider can include a mailbox provider, a hosting Internet service provider (ISP), a transit ISP (e.g., upstream ISP), a virtual ISP (e.g., wholesale ISP), a wireless ISP (e.g., cellular carrier), the like, or any combination thereof. The first access domain 121a can include a first access node 123a (e.g., gateway router, access point, base station), a first core node 127a (e.g., core router), a third network node 129a (e.g., server), or any combination thereof, all of which can be coupled over a first access network 125a (e.g., WiFi, Bluetooth, nearfield, cellular, satellite, ethernet, cable, fiber, USB). Similarly, the second access domain 121b can include a second access node 123b, a second core node 127b, a fourth network node 129b (e.g., server), or any combination thereof, all of which can be coupled over a second access network 125b. Each access node 123a-b can also be associated with a picocell, femtocell, microcell, macrocell, or the like. Further, each access domain 121a-b can include one or more picocells, femtocells, microcells, macrocells, the like, or any combination thereof. In addition, the system 100a-b includes a fifth network node 131 that is coupled to each access domain 121a-b over the second network 145. The first network node 103 is operable to couple the first network domain 101 to each access domain 121a-b. Each access node 123a-b is operable to couple the first network domain 101 to the second network 145 over the access nodes 123a-b.

In FIGS. 1A-B, the first network node 103 can include a router circuit 105, memory 107, a user or device activity determination circuit 111, or any combination thereof. The router circuit 105 is operable to route packets. The user or device activity determination circuit 111 can be operable to determine user or device activity associated with a packet flow. In one example, a packet flow is one or more packets associated with the same source and the same destination. Further, the source and destination can be associated with an address (e.g., Internet protocol (IP) address), a port (e.g., transmission control protocol (TCP) port, user datagram protocol (UDP) port), a protocol field (e.g., IP header) of a packet, the like, or any combination thereof. The memory 107 can include a network metric(s) 108 and user or device activity preference(s) 109. A network metric 108 can be associated with a statistical representation of a network characteristic of an access domain 121a-b. In one example, a network characteristic is associated with network health such as packet loss, packet retransmission, network bandwidth, network throughput, network error log, system error counts, number failed and running links, latency, congestion, network noise, device malfunction counts, upload and download speeds, jitter, round-trip time, server response time, or the like. In another example, a network characteristic is associated with the network usage of a network node over a certain time period. In another example, a network characteristic is associated with a utilization rate or capacity by link such as asked vs. supplied bandwidth (e.g., ISPs typically intelligently throttle to minimize network downtime), bandwidth usage percentage, or installed bandwidth. In another example, a network characteristic is associated with network outages such as network availability or connectivity across network nodes. In another example, a network characteristic is associated with economic variables such as willingness to pay per mega-byte (MB) by consumer by type (e.g., priority, video vs non-video), willingness to sell per MB by consumer by type, consumption and sales of on-demand bandwidth by customer, or type or time of day.

In the current embodiment, a user or device activity preference 109 can be a certain preference of user or device activity associated with a network node 119 that requires network access over an access domain 121a,b. In one example, a user or device activity preference 109 can be associated with bulk data transfers (e.g., network transfer of large volumes of data files), video playback (e.g., video streaming), web browsing, real-time interactive behavior (e.g., gaming, cloud-based applications, video conferencing), idle behavior (e.g., background traffic when user is idle), the like, or any combination thereof. In another example, the user or device activity preference 109 can be associated with network quality such as network speed or network uptime. In another example, a user or device activity preference 109 can be associated with a type of user or device activity such as video vs. non-video. In another example, the user or device activity preference 109 can be associated with usage such as home, work, kids, or any combination thereof. In yet another example, the user or device activity preference 109 can be associated with an service provider cost preference.

In FIGS. 1A-B, the third network node 129a can determine a network characteristic of the first access domain 121a. The third network node 129a can then send, to the fifth network node 131 over the second network 143, an indication 161 that includes the first access network characteristic. The fifth network node 131 can receive the indication 161 and can update that characteristic in a network characteristic(s) database 135, which includes network characteristics associated with the first and second access domains 121a,b, as represented by block 181b in FIG. 1B. Similarly, the fourth network node 129b can determine a network characteristic of the second access domain 121b. The fourth network node 129b can then send, to the fifth network node 131 over the second network 143, an indication 162 that includes the second access network characteristic. The fifth network node 131 can receive the indication 162 and can update that characteristic in the network characteristic(s) database 135, as represented by block 183b in FIG. 1B. The fifth network node 131 can determine a network metric of the first or second access network 121a,b based on the updated network characteristic(s) of the first or second access network 121a,b, as represented by block 185b in FIG. 18. Further, the fifth network node 131 can update the network metric(s) database 137 based on the determined network metric. The fifth network node 131 can then send, to the first network node 103 over the first or second access node 123a,b, an indication 164 that includes the network metric. The first network node 103 can receive, from the fifth network node 131 over the first or second access node 123a,b, an indication 167 of the network metric and can then update the network metric(s) 108. Further, the first network node 103 can receive, from the first network node 115 over the first network 143, an indication 163 of the user or device activity preference and can then updates the user or device activity preference(s) 109 based on that received indication 163.

During operation of the first network node 103, the first network node 103 can receive one or more packets of the first and second packet flows 165, 166. The activity determination circuit 111 can then determine the user or device activity associated with the one or more packets of each packet flow 165, 166, as represented by block 187b in FIG. 1B. The router circuit 105 can then determine to route the first packet flow 165 through the first access node 123a and the second packet flow 166 through the second access node 123b based on the user or device activity determined for each packet flow 165, 166, the network metric(s) 108, or the activity preference(s) 109, as represented by block 189b in FIG. 18. As such, the first network node 103 can route the first packet flow 165 through the first access node 123a and the second packet flow 166 through the second access node 123b.

In another embodiment, the first network node 103 can obtain an access domain profile (e.g., electronic or embedded Subscriber Identity Module (eSIM)) associated with the first or second access domains 121*a,b* to enable the first network node 103 to access the second network 145 over the first or second access domains 121*a-b*. In one example, the first network node 103 can send, to the third network node 129*a* of the first access network 125*a* over the first access node 123*a*, a request for an access domain profile associated with the first access domain 121*a*. In response, the third network node 129*a* can send, to the first network node 103 over the first access node 123*a*, an indication of the access domain profile associated with the first access domain 121*a*. The first network node 103 can receive this indication and can then obtain the access domain profile associated with the first access network 125*a* based on this indication. The first network node 103 can then route the first packet flow 165 over the first access domain 121*a* based on the access domain profile associated with the first access network 125*a*. In another example, the first network node 103 can send, to the fifth network node 131 over the first access domain 121*a*, an indication that includes a request for an access domain profile associated with the second access domain 121*b*. In response, the fifth network node 131 can send, to the first network node 103 over the first access domain 121*a*, an indication that includes the access domain profile associated with the second access domain 121*b*. The first network node 103 can receive this indication and can then obtain the access domain profile associated with the second access domain 121*b* based on this indication. The first network node 103 can then route the first packet flow 165 over the first access domain 121*a* based on the access domain profile associated with the first access domain 121*a*. In another example, the first network node 103 can send, to the fourth network node 129*b* over the first access domain 121*a*, an indication that includes a request for an access domain profile associated with the second access domain 121*b*. In response, the fourth network node 129*b* can send, to the first network node 103 over the first access domain 121*a*, an indication that includes the access domain profile associated with the second access domain 121*b*. The first network node 103 can receive this indication and can then obtain the access domain profile associated with the second access domain 121*b* based on this indication. The first network node 103 can then route the second packet flow 166 over the second access domain 121*b* based on the access domain profile associated with the second access domain 121*b*.

In another embodiment, the first network node 103 can maintain a dynamic allocation of access domain profiles (e.g., eSIMs) associated with those access domains 121*a,b* that the first network node 103 can subscribe, with each access domain 121*a,b* representing one or more services (e.g., data, voice). Each access domain profile can include one or more service modules, with each service module enabling the first network node 103 to communicate with the corresponding access domains 121*a,b* for that service. Further, the first network node 103 can receive an access domain profile installation application from a network node 129*a,b*, 143 that can enable the first network node 103 to install the access domain profile into the memory 107 of the first network node 103. The memory 107 may include an electronic embedded Universal Integrated Circuit Card (eUICC) for storing the access domain profiles. The access domain profile installation application can include the access domain profile, one or more access domains that correspond to the access domain profile, device configuration information to enable the first network node 103 to communicate with the corresponding access domain 121*a,b*, the like, or any combination thereof. The first network node 103 can implement a unified access domain profile that represents instantiations of service modules of a plurality of access domain profiles. For instance, the first network node 103 can implement a virtual access domain profile by instantiating a first service module of a first access domain profile associated with the first access domain 121*a* that enables the first network node 103 to access the first access domain 121*a* for the first service and by instantiating a second service module of a second access domain profile associated with the second access domain 121*b* that enables the first network node 103 to access the second access domain 121*b* for the second service.

In another embodiment, the first and second access networks are homogenous networks.

In another embodiment, the first and second access networks are heterogeneous networks.

Figure 2A:
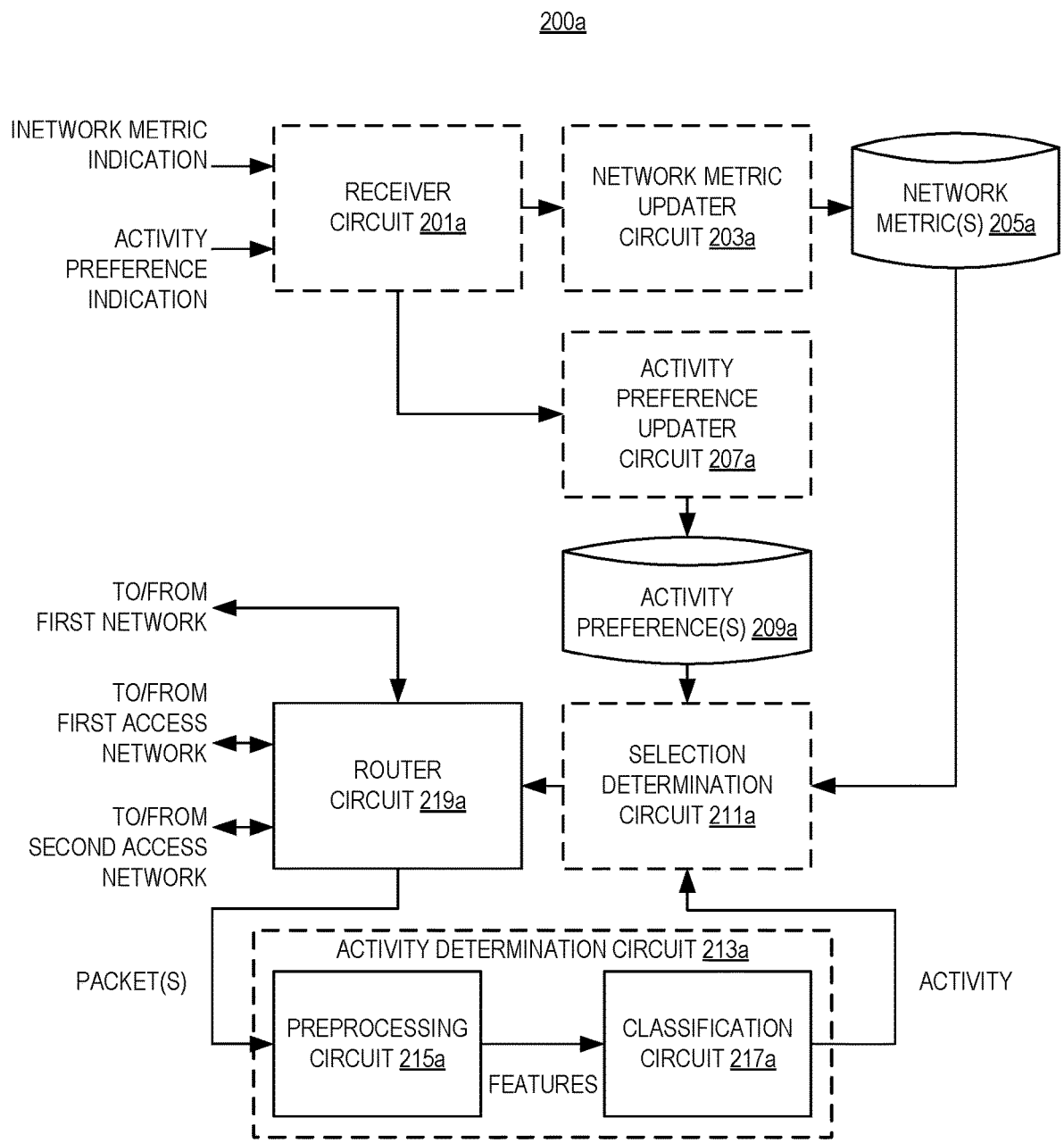
FIGS. 2A-D illustrate other embodiments of a network node in accordance with various aspects as described herein.

FIGS. 2A-D illustrate other embodiments of a network node in accordance with various aspects as described herein. In FIGS. 2A-E, the device 200*a-e* implements various functional means, units, or modules (e.g., via the processing circuitry 301 in FIG. 3, via the processing circuitry 501 in FIG. 5, via software code, or the like), or circuits. In FIG. 2A, in one embodiment, these functional means, units, modules, or circuits (e.g., for implementing the method(s) described herein) may include for instance: a receiver circuit 201*a* operable to receive information; a network metric updater circuit 203*a* operable to update network metrics in a network metric database 205*a*; an activity preference updater circuit 207*a* operable to update activity preferences in an activity preferences database 209*a*; a selection determination circuit 211*a* operable to; an activity determination circuit 213*a* operable to determine the activity associated with each of the first and second packet flows based on the one or more packets of that packet flow; a preprocessing circuit 215*a* operable to extract features of a packet flow; a classification circuit 217*a* operable to classify the activity of a packet flow; a router circuit 219*a* operable to route the first packet flow to the access node associated with the first access network and the second packet flow to the access node associated with the second access network based on the network metric, the activity preference, or the corresponding activity.

Figure 2B:
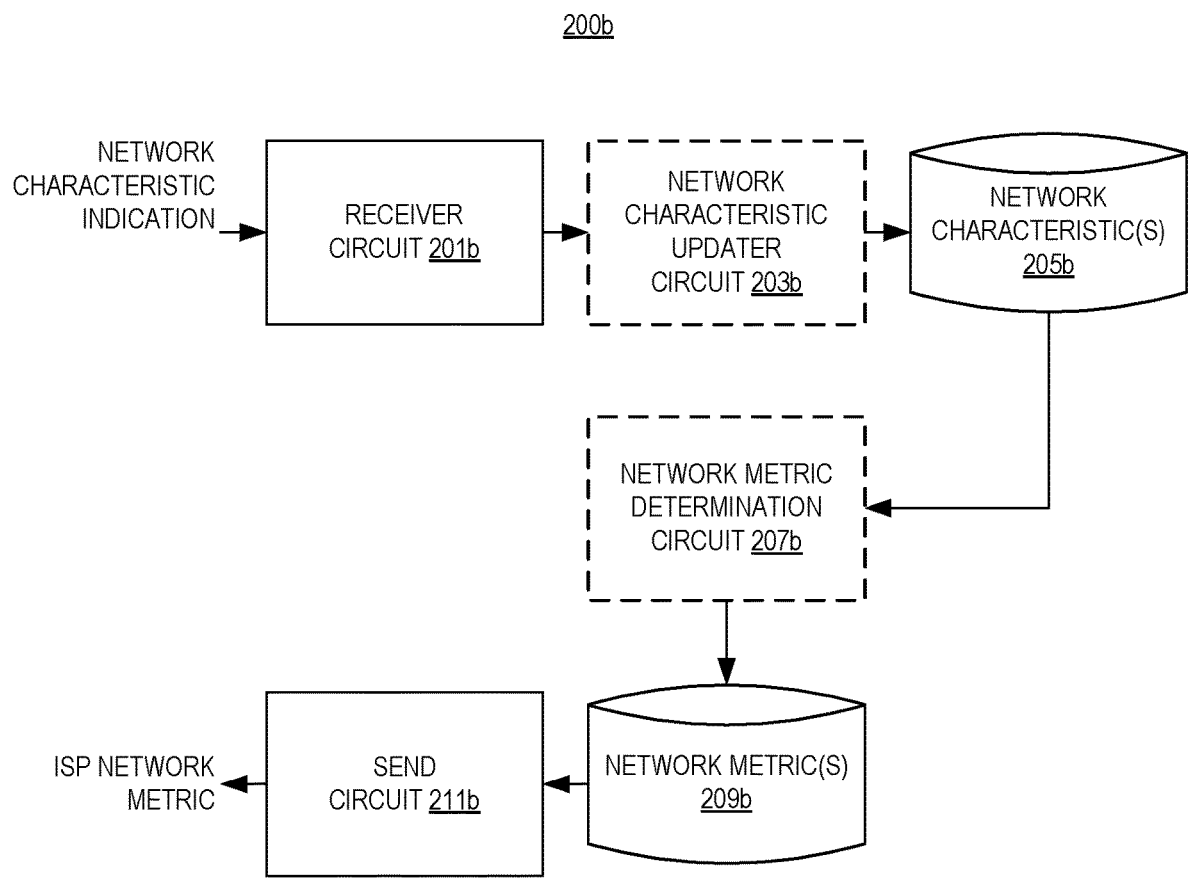

In FIG. 2B, in another embodiment, these functional means, units, modules, or circuits (e.g., for implementing the method(s) described herein) may include for instance: a receiver circuit 201*b* operable to receive information; a network characteristic update circuit 203*b* operable to update the network characteristics 205*b*; a network metric determination circuit 207*b* operable to update network metrics 209*b*; and a send circuit 211*b* operable to update network metrics.

Figure 2C:
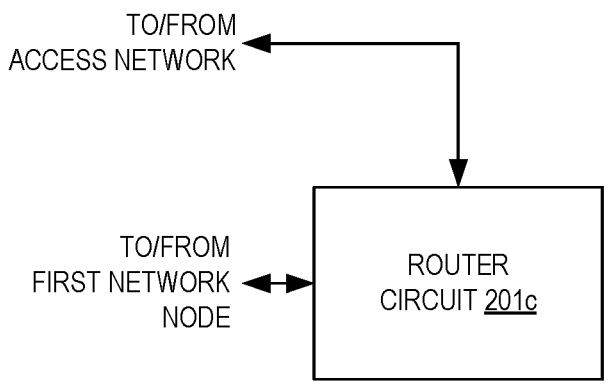
Figure 2D:
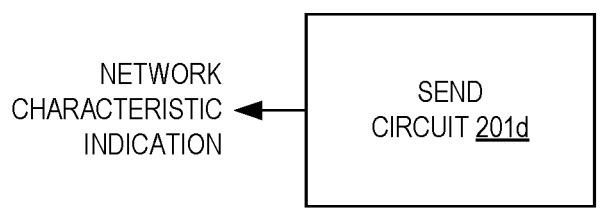

In FIG. 2C, in another embodiment, these functional means, units, modules, or circuits (e.g., for implementing the method(s) described herein) may include for instance: a router circuit 201*c* operable to route a packet flow between the first and second networks over the first access network. In FIG. 2D, in another embodiment, these functional means, units, modules, or circuits (e.g., for implementing the method(s) described herein) may include for instance: a router circuit 201*d* operable to send, to a network node associated with a second network, an indication of a network characteristic associated with the first or second access network.

Figure 3:
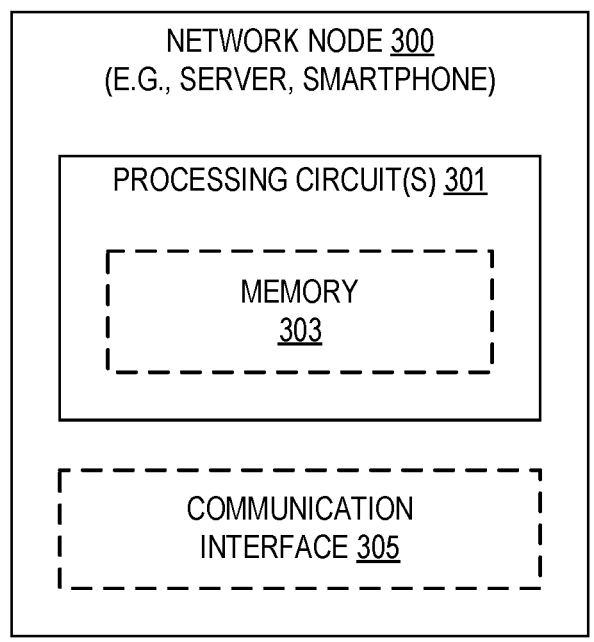
FIG. 3 illustrates one embodiment of a network node in accordance with various aspects as described herein.

FIG. 3 illustrates one embodiment of a network node in accordance with various aspects as described herein. In FIG. 3, the device 300*a* may include processing circuitry 301 that is operably coupled to one or more of the following: memory 303, network communications circuitry 305, or the like. The network communication circuitry 305 is configured to transmit or receive information to or from one or more other devices via any communication technology. The processing circuitry 301 is configured to perform processing described herein, such as by executing instructions stored in memory 303. The processing circuitry 301 in this regard may implement certain functional means, units, or modules.

Figure 4A:
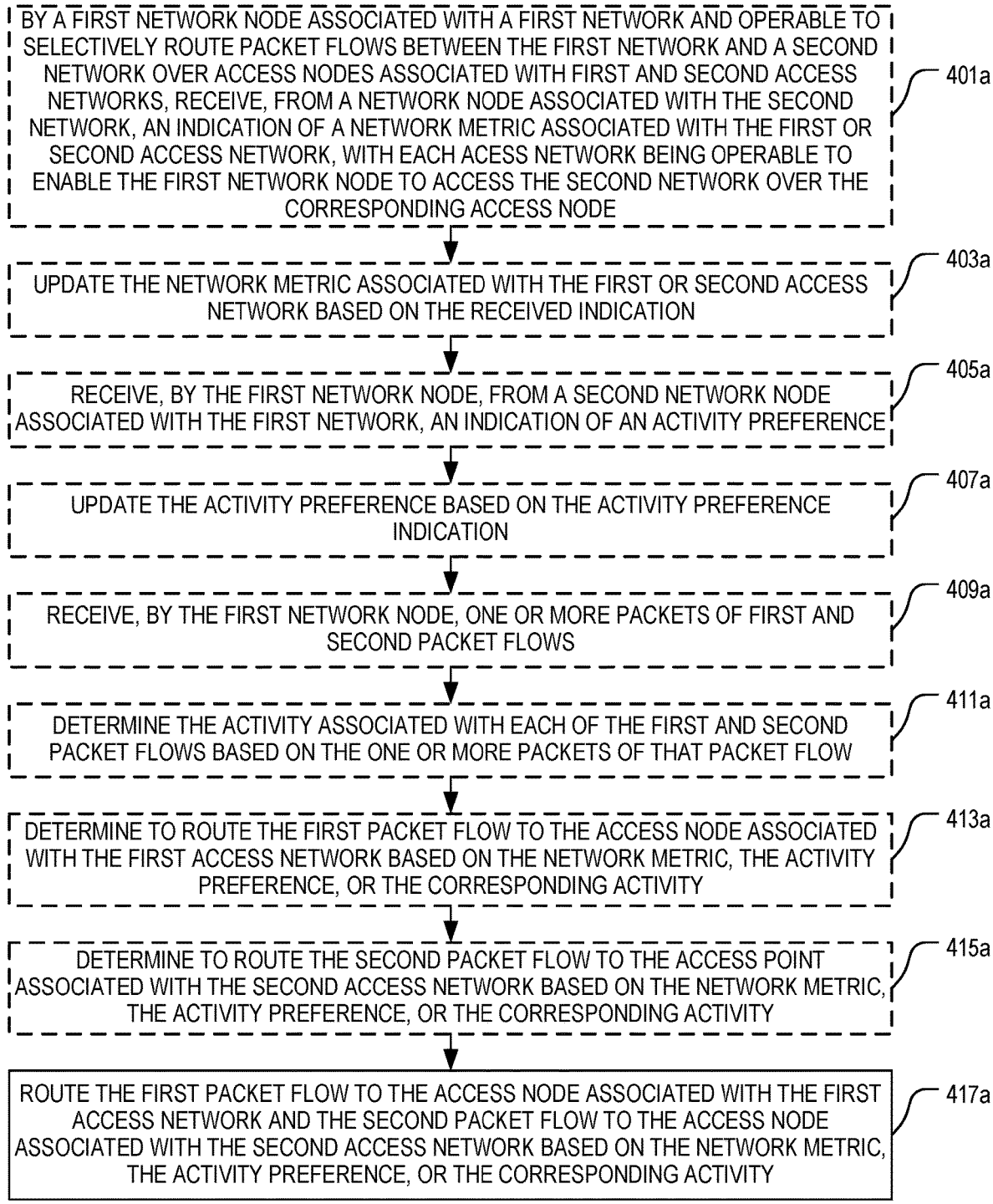

FIGS. 4A-D illustrate embodiments of a method 400a-d performed by a network node 103, 200a-d, 300, 500 of selectively routing a packet flow in accordance with various aspects as described herein. In FIG. 4A, the method 400a may start, for instance, at block 401a where it may include receiving, from a network node associated with the second network, an indication of a network metric associated with the first or second access network. In response, the method 400a may include updating the network metric associated with the first or second access network based on the received network metric associated with the first or second access network, as referenced by block 403a. At block 405a, the method 400a may include receiving, from a second network node associated with the first network, an indication of an activity preference. In response, the method 400a may include updating the activity preference based on the activity preference indication, as referenced by block 407a. At block 409a, the method 400a may include receiving one or more packets of first and second packet flows. At block 411a, the method 400a may include determining the activity associated with each of the first and second packet flows based on the one or more packets of that packet flow. At block 413a, the method 400a may include determining to route the first packet flow to the access node associated with the first access network based on the network metric, the activity preference, or the corresponding activity. Similarly, the method 400a may include determining to route the second packet flow to the access point associated with the second access network based on the network metric, the activity preference, or the corresponding activity, as referenced by block 415a. At block 417a, the method 400a includes routing the first packet flow to the access node associated with the first access network and the second packet flow to the access node associated with the second access network based on the network metric, the activity preference, or the corresponding activity.

Figure 4B:
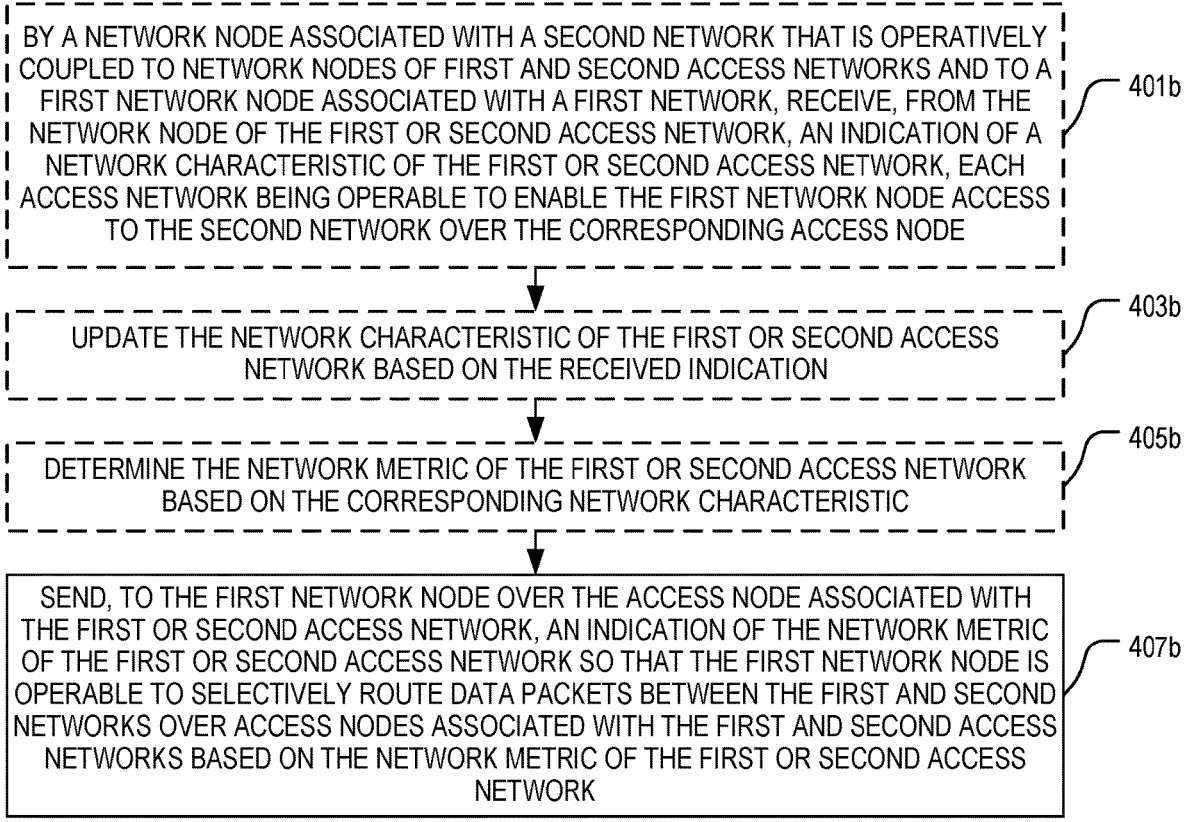

In FIG. 4B, the method 400b may start, for instance, at block 401b where it may include receiving, from a network node of the first or second access network, an indication of a network characteristic of the first or second access network. In response, the method 400b may include updating the network characteristic of the first or second access network based on the received indication, as represented by block 403b. At block 405b, the method 400b may include determining the network metric of the first or second access network based on the corresponding network characteristic. At block 407b, the method 400b includes sending, to a network node of the first network over the access node associated with the first or second access network, an indication that includes the network metric of the first or second access network so that the network node of the first network is operable to selectively route data packets between the first and second networks over access nodes associated with the first and second access networks based on the network metric of the first or second access network.

In FIG. 4C, the method 400c may start, for instance, at block 401c where it includes routing a packet flow between the first and second networks over the first access network, with the network node associated with the first network is operable to selectively route data packets between the first and second networks over the access node associated with the first access network and an access node associated with a second access network.

In FIG. 4D, the method 400d may start, for instance, at block 401d where it includes sending, to a network node associated with a second network, an indication of a network characteristic associated with the first or second access network. Further, each access network is operable to enable the network node associated with the first network to access the second network over a corresponding access node of the first and second access networks.

Figure 5:
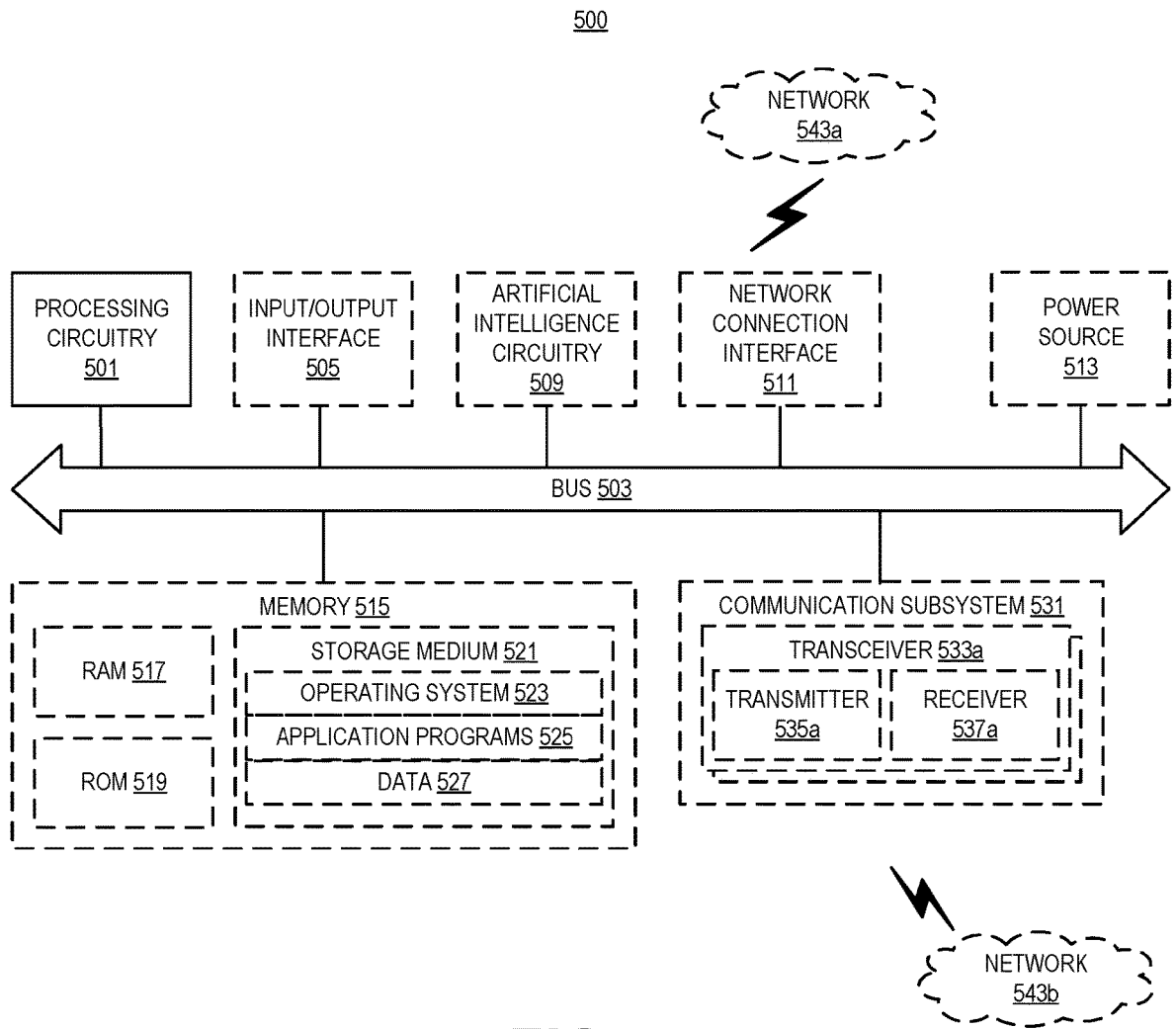
FIG. 5 illustrates another embodiment of a network node in accordance with various aspects as described herein.

FIG. 5 illustrates another embodiment of a network node device 500 in accordance with various aspects as described herein. In FIG. 5, the device 500 includes processing circuitry 501 that is operatively coupled to input/output interface 505, artificial intelligence (AI) circuit 509, network connection interface 511, memory 515 including random access memory (RAM) 517, read-only memory (ROM) 519, and storage medium 521 or the like, communication subsystem 531, power source 533, and/or any other component, or any combination thereof. Storage medium 521 includes operating system 523, application program 525, and data 527. In other embodiments, storage medium 521 may include other similar types of information. Certain devices may utilize all of the components shown in FIG. 5, or only a subset of the components. The level of integration between the components may vary from one device to another device. Further, certain devices may contain multiple instances of a component, such as multiple processors, memories, neural networks, network connection interfaces, transceivers, etc.

In FIG. 5, processing circuitry 501 may be configured to process computer instructions and data. Processing circuitry 501 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 501 may include two central processing units (CPUs). Data may be information in a form suitable for use by a computer.

In the depicted embodiment, input/output interface 505 may be configured to provide a communication interface to an input device, output device, or input and output device. The device 500 may be configured to use an output device via input/output interface 505. An output device may use the same type of interface port as an input device. For example, a USB port may be used to provide input to and output from the device 500. The output device may be a speaker, a sound card, a video card, a display, a monitor, a printer, an actuator, an emitter, a smartcard, another output device, or any combination thereof. The device 500 may be configured to use an input device via input/output interface 505 to allow a user to capture information into the device 500. The input device may include a touch-sensitive or presence-sensitive display, a microphone, a sensor, a mouse, a trackball, a directional pad, a trackpad, a scroll wheel, a smartcard. and the like. The presence-sensitive display may include a capacitive or resistive touch sensor to sense input from a user. A sensor may be, for instance, an accelerometer, a gyroscope, a tilt sensor, a force sensor, a magnetometer, an optical or image sensor, an infrared sensor, a proximity sensor, another like sensor, or any combination thereof.

In FIG. 5, the AI circuitry 509 may be configured to learn to perform tasks by considering examples. In one example, the AI circuitry 509 may be configured, using machine learning techniques, to perform real-time or quasi-real-time user or device activity classification based on one or more packets of a packet flow. The network connection interface 511 may be configured to provide a communication interface to network 543*a*. The network 543*a* may encompass wired and/or wireless networks such as a local-area network (LAN), a wide-area network (WAN), a computer network, a wireless network, a telecommunications network, another like network or any combination thereof. For example, network 543*a* may comprise a Wi-Fi network. The network connection interface 511 may be configured to include a receiver and a transmitter interface used to communicate with one or more other devices over a communication network according to one or more communication protocols, such as Ethernet, TCP/IP, SONET, ATM, or the like. The network connection interface 511 may implement receiver and transmitter functionality appropriate to the communication network links (e.g., optical, electrical, and the like). The transmitter and receiver functions may share circuit components, software or firmware, or alternatively may be implemented separately.

The RAM 517 may be configured to interface via a bus 503 to the processing circuitry 501 to provide storage or caching of data or computer instructions during the execution of software programs such as the operating system, application programs, and device drivers. The ROM 519 may be configured to provide computer instructions or data to processing circuitry 501. For example, the ROM 519 may be configured to store invariant low-level system code or data for basic system functions such as basic input and output (I(0), startup, or reception of keystrokes from a keyboard that are stored in a non-volatile memory. The storage medium 521 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, the storage medium 521 may be configured to include an operating system 523, an application program 525 such as a widget or gadget engine or another application, a data file 527, a data cache 529, and a message log 530. The storage medium 521 may store, for use by the device 500, any of a variety of various operating systems or combinations of operating systems.

The storage medium 521 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. The storage medium 521 may allow the device 500 to access computer-executable instructions, application programs or the like, stored on transitory or non-transitory memory media, to off-load data, or to upload data. An article of manufacture, such as one utilizing a communication system may be tangibly embodied in the storage medium 521, which may comprise a device readable medium.

In FIG. 5, the processing circuitry 501 may be configured to communicate with network 543*b* using the communication subsystem 531. The network 543*a* and the network 543*b* may be the same network or networks or different network or networks. The communication subsystem 531 may be configured to include one or more transceivers used to communicate with the network 543*b*. For example, the communication subsystem 531 may be configured to include one or more transceivers used to communicate with one or more remote transceivers of another device capable of wireless communication according to one or more communication protocols, such as IEEE 802.11, CDMA, WCDMA, GSM, LTE, UTRAN, WiMax, or the like. Each transceiver may include transmitter 533 and/or receiver 535 to implement transmitter or receiver functionality, respectively, appropriate to the RAN links (e.g., frequency allocations and the like). Further, transmitter 533 and receiver 535 of each transceiver may share circuit components, software or firmware, or alternatively may be implemented separately.

In the illustrated embodiment, the communication functions of the communication subsystem 531 may include data communication, voice communication, multimedia communication, short-range communications such as Bluetooth, near-field communication, location-based communication such as the use of the global positioning system (GPS) to determine a location, another like communication function, or any combination thereof. For example, the communication subsystem 531 may include cellular communication, Wi-Fi communication, Bluetooth communication, and GPS communication. The network 543*b* may encompass wired and/or wireless networks such as a local-area network (LAN), a wide-area network (WAN), a computer network, a wireless network, a telecommunications network, another like network or any combination thereof. For example. the network 543*b* may be a cellular network, a Wi-Fi network, and/or a near-field network. The power source 513 may be configured to provide alternating current (AC) or direct current (DC) power to components of the device 500.

The features, benefits and/or functions described herein may be implemented in one of the components of the device 500 or partitioned across multiple components of the device 500. Further, the features. benefits, and/or functions described herein may be implemented in any combination of hardware, software or firmware. In one example, communication subsystem 531 may be configured to include any of the components described herein. Further, the processing circuitry 501 may be configured to communicate with any of such components over the bus 503. In another example, any of such components may be represented by program instructions stored in memory that when executed by the processing circuitry 501 perform the corresponding functions described herein. In another example, the functionality of any of such components may be partitioned between the processing circuitry 501 and the communication subsystem 531. In another example, the non-computationally intensive functions of any of such components may be implemented in software or firmware and the computationally intensive functions may be implemented in hardware.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts for illustrative purposes, but the embodiments are similarly applicable in other contexts not explicitly described.

Coordinating Agent: a coordinating agent is associated with a model that is constantly being refined and trained in a cloud server that takes the temporal data that is stored in the databases. The temporal data can include network health, packet loss and retransmission, bandwidth, throughput, error log or system error counts, the number of failed and running links, latency, congestion, network noise, device malfunction counts, upload and download speeds, jitter, round-trip time, server response time, network usage by participating network node over time, utilization rate and related capacity by link, asked vs. supplied bandwidth (ISPs usually intelligently throttle so minimize downtime), bandwidth usage percentage, installed bandwidth, outages, network availability, connectivity across nodes, economic variables, willingness to pay per megabyte or megabit by consumer by type (e.g., priority, video vs non-video), willingness to sell per megabyte or megabit by consumer by type, consumption and sales of on-demand bandwidth by customer, type or time of day, the like, or any combination thereof.

One advantage of the data being temporal includes being enabled to predict demand and supply in the next time interval. Another advantage includes being enabled to build aggregate supply and demand curves that can be used to analyze how and when to route packets through which access network. Yet another advantage includes being enabled to optimally distribute network bandwidth between access networks based on constraints. In effect, the temporal data is being applied to a continuous economic optimization problem. These models and rules can then be deployed at an edge router (as one of the route control characteristics) to reduce latency and solve the economic problem continuously and where it happens. Further, the router can feedback the temporal data to the coordinating agent to assist in resolving or understanding any network-related problems and to create a training set for the next iteration of an artificial intelligence model. The processing cycle of this system can be represented in pseudocode as follows: Network Characteristics+Economic Preferences Database->AI Model->rule set for (1) selecting across ISPs and (2) realtime personalized (or generic) optimization of ISP network of networks->network characteristic data+economic preference data+outcome data (performance improved?)->AI Model.

Route control characteristics: When a user sets up an edge router, the user can provide activity preferences for routing packet data. This is essentially what creates a preference matrix that is then used as a model input that is deployed on the router and acts as a personalization of the optimization that will be solved. Outages in an ISPs network can impact the network's uptime, speed and the like. The main difference is that the model or rule set generated by the coordinating agent can perform two different but related jobs at the ISP vs. the edge router. Among ISPs, it is optimizing the economic use of the network of networks that can be created. For an edge router, the personalized performance of data packets communicated over the networks can be optimized based on a user's preferences, usage patterns or willingness to pay through an instantiation of the coordinating agent. General preference areas can include quality, speed, uptime, type (e.g., video, general data), usage (e.g., home, work, school), price preferences, the like, or any combination thereof.

In one embodiment, a method is performed by an edge router associated with a first network (e.g., LAN, WLAN) and operable to selectively route packet flows between the first network and a second network (e.g., Internet) over a first gateway router associated with a first Internet service provider (ISP) and a second gateway router associated with a second ISP. The method comprises routing both a first packet flow to the first gateway router and a second packet flow to the second gateway router based on a network metric associated with the first or second ISP, a user or device activity preference associated with the first network, or a user or device activity associated with the first or second packet flow. Further, each ISP is operable to enable the edge router to access the second network over the corresponding gateway router.

In another embodiment, the method further includes receiving, by the edge router, one or more packets associated with the first packet flow.

In another embodiment, the method further includes determining that the first packet flow is associated with a first user or device activity based on the one or more packets associated with the first packet flow.

In another embodiment, the method further includes receiving, by the edge router, one or more packets associated with the second packet flow.

In another embodiment, the method further includes determining that the second packet flow is associated with a second user or device activity based on the one or more packets associated with the second packet flow.

In another embodiment, the method further includes determining to route the first packet flow to the first gateway router based on the network metric associated with the first or second ISP, the user or device activity preference associated with the first network, or the user or device activity associated with the first or second packet flow.

In another embodiment, the method further includes determining to route the second packet flow to the second gateway router based on the network metric associated with the first or second ISP, the user or device activity preference associated with the first network, or the user or device activity associated with the first or second packet flow.

In another embodiment, the method further includes receiving, by the edge router over the first or second gateway router, from a network node associated with the second network, an indication of the network metric associated with the first or second ISP.

In another embodiment, the method further includes updating the network metric associated with the first or second ISP based on the network metric indication.

In another embodiment, the method further includes receiving, by the edge router, from a second network node (e.g., wired or wireless device) associated with the first network, an indication of a user or device activity preference associated with the first network.

In another embodiment, the method further includes updating the user or device activity preference based on the user or device activity preference indication.

In another embodiment, the method further includes determining a network characteristic associated with the first network.

In another embodiment, the method further includes sending, by the edge router over the first or second gateway router, to a network node associated with the second network, an indication of a network characteristic associated with the first network.

In another embodiment, the method further includes determining a network characteristic associated with the second network.

In another embodiment, the method further includes sending, by the edge router over the first or second gateway router, to a network node associated with the second network, an indication of a network characteristic associated with the second network.

In another embodiment, the user or device activity associated with the first or second packet flow is related to one or more of bulk data transfers, video playback, web browsing, real-time interactive behavior, and idle behavior.

In another embodiment, the network metric is associated with network availability, performance, or utilization.

In another embodiment, the network metric is associated with an economic indication of network availability, performance, or utilization.

In another embodiment, the user or device activity preference is related to a certain user or device activity associated with a network node of the first network.

In another embodiment, the user or device activity preference is associated with network availability. performance, or utilization.

In another embodiment, the user or device activity preference is associated with an economic indication of network availability, performance, or utilization.

In another embodiment, the first and second ISPs are the same ISP.

In one embodiment, an edge router comprises processing circuitry and a memory.

Further, the memory comprises instructions executable by the processing circuitry whereby the processing circuitry is configured to route a first packet flow to a first gateway router associated with a first ISP and a second packet flow to a second gateway router associated with a second ISP based on a network metric associated with the first or second ISP, a user or device activity preference associated with a first network, or user or device activity associated with the first or second packet flow. Further, the edge router is associated with the first network and operable to selectively route packets between the first network and a second network over the first and second gateway routers. Each ISP is operable to enable the edge router to access the second network over the corresponding gateway router.

In one embodiment, a method is performed by a first gateway router associated with a first ISP. The method comprises routing a packet flow between first and second networks over an edge router associated with the first network. Further, the edge router is operable to selectively route packets between the first and second networks over the first gateway router and a second gateway router associated with a second ISP. Each ISP is operable to enable the edge router to access the second network over the corresponding gateway router.

In one embodiment, a first gateway router associated with a first ISP comprises processing circuitry and a memory. Further, the memory comprises instructions executable by the processing circuitry whereby the processing circuitry is configured to route a packet flow between first and second networks over an edge router associated with a first network. Further, the edge router is operable to selectively route packets between the first and second networks over the first gateway router and a second gateway router associated with a second ISP based on a network metric associated with the first or second ISP, a user or device activity preference associated with the first network, or user or device activity associated with the first or second packet flow. Each ISP is operable to enable the edge router to access the second network over the corresponding gateway router.

In one embodiment, a method is performed by a network node associated with a second network that is operatively coupled to network nodes associated with first and second ISPs and to an edge router associated with a first network. The method comprises sending, to the edge router, an indication of a network metric associated with the first or second ISP so that the edge router is operable to selectively route packets between the first and second networks over gateway routers associated with the first and second ISPs. Further, each ISP is operable to enable the edge router to access the second network over the corresponding gateway router.

In another embodiment, the method further includes receiving, by the network node associated with the second network, from a network node associated with the first ISP, an indication associated with a network characteristic of the first ISP.

In another embodiment, the method further includes updating the network characteristic of the first ISP based on the received indication.

In another embodiment, the method further includes receiving, by the network node associated with the second network, from a network node associated with the second ISP, an indication associated with a network characteristic of the second ISP.

In another embodiment, the method further includes updating the network characteristic of the second ISP based on the received indication.

In another embodiment, the method further includes determining the network metric associated with the first or second ISP based on the network characteristic of the first or second ISP.

In one embodiment, a network node associated with a second network comprises processing circuitry and a memory. Further, the memory comprises instructions executable by the processing circuitry whereby the processing circuitry is configured to send, to an edge router associated with a first network, an indication of a network metric of a first or second ISP so that the edge router is operable to selectively route packets between the first and second networks over corresponding gateway routers of the first and second ISPs based on the network metric of the first or second ISP.

In one embodiment, a method is performed by a network node associated with a first ISP, sending, to a network node associated with a second network, an indication associated with network characteristics of the first ISP so that an edge router associated with a first network is operable to selectively route packets between the first and second networks over a gateway router of the first ISP and a gateway router of a second ISP based on the network characteristic of the first ISP.

In one embodiment, a network node associated with a first ISP comprises processing circuitry and a memory. Further, the memory comprises instructions executable by the processing circuitry whereby the processing circuitry is configured to send, to a network node associated with a second network, an indication of a network characteristic associated with the first ISP so that an edge router associated with a first network is operable to selectively route packets between the first and second networks over a gateway router of the first ISP and a gateway router of a second ISP based on the network characteristic of the first ISP.

In one exemplary embodiment, a method is performed by a first network node associated with a first network and operable to selectively route packet flows between the first network and a second network over a first access node associated with a first access network and a second access node associated with a second access network. The method includes routing both a first packet flow to the first access node and a second packet flow to the second access node based on a network metric associated with the first or second access network, a user or device activity preference associated with the first network or a user or device activity associated with the first or second packet flow. Further, each access network is operable to enable the first network node to access the second network over the corresponding access node.

In another exemplary embodiment, the method can include receiving, by the first network node, one or more packets associated with the first packet flow.

In another exemplary embodiment, the method can include determining that the first packet flow is associated with a first user or device activity based on the one or more packets associated with the first packet flow.

In another exemplary embodiment, the method can include receiving, by the first network node, one or more packets associated with the second packet flow.

In another exemplary embodiment, the method can include determining that the second packet flow is associated with a second user or device activity based on the one or more packets associated with the second packet flow.

In another exemplary embodiment, the method can include determining to route the first packet flow to the first access node based on the network metric associated with the first or second access network, the user or device activity preference associated with the first network or the user, or device activity associated with the first or second packet flow.

In another exemplary embodiment, the method can include determining to route the second packet flow to the second access node based on the network metric associated with the first or second access network, the user or device activity preference associated with the first network, or the user or device activity associated with the first or second packet flow.

In another exemplary embodiment, the method can include receiving, by the first network node over the first or second access node, from a network node associated with the second network, an indication of the network metric associated with the first or second access network.

In another exemplary embodiment, the method can include updating the network metric associated with the first or second access network based on the network metric indication.

In another exemplary embodiment, the method can include receiving, by the first network node, from a second network node associated with the first network, an indication of a user or device activity preference associated with the first network.

In another exemplary embodiment, the method can include updating the user or device activity preference based on the user or device activity preference indication.

In another exemplary embodiment, the method can include determining a network characteristic associated with the first network.

In another exemplary embodiment, the method can include sending, by the first network node over the first or second access node, to a network node associated with the second network, an indication of a network characteristic associated with the first network.

In another exemplary embodiment, the method can include determining a network characteristic associated with the second network.

In another exemplary embodiment, the method can include sending, by the first network node over the first or second access node, to a network node associated with the second network, an indication of a network characteristic associated with the second network.

In another exemplary embodiment, the user or device activity associated with the first or second packet flow is related to video conferencing.

In another exemplary embodiment, the network metric is associated with network availability. performance, or utilization.

In another exemplary embodiment, the network metric is associated with an economic indication of network availability, performance, or utilization.

In another exemplary embodiment, the user or device activity preference is related to a certain user or device activity associated with a second network node of the first network.

In another exemplary embodiment, the user or device activity preference is associated with network availability, performance, or utilization.

In another exemplary embodiment, the user or device activity preference is associated with an economic indication of network availability, performance, or utilization.

In another exemplary embodiment, the first and second access networks are the same access network.

In one exemplary embodiment, a first network node is associated with a first network and includes processing circuitry and a memory with the memory comprising instructions executable by the processing circuitry whereby the processing circuitry is configured to route a first packet flow to a first access node associated with a first access network and a second packet flow to a second access node associated with a second access network based on a network metric associated with the first or second access network, a user or device activity preference associated with the first network or user or device activity associated with the first or second packet flow. Further, the first network node is operable to selectively route packets between the first network and a second network over the first and second access nodes. Also, each access network is operable to enable the first network node to access the second network over the corresponding access node.

In one exemplary embodiment, a method is performed by an access node associated with a first access network. The method includes routing a packet flow between first and second networks over a network node associated with the first network, with the network node associated with the first network being operable to selectively route packets between the first and second networks over the access node associated with the first access network and an access node associated with a second access network based on a network metric associated with the first or second access network, a user or device activity preference associated with the first network or a user or device activity associated with the first or second packet flow. Further, each access network is operable to enable the network node associated with the first network to access the second network over the corresponding access node.

In one exemplary embodiment, an access node is associated with a first access network and includes processing circuitry and a memory with the memory comprising instructions executable by the processing circuitry whereby the processing circuitry is configured to route a packet flow between first and second networks over a network node associated with the first network, the network node associated with the first network being operable to selectively route packets between the first and second networks over the access node associated with the first access network and an access node associated with a second access network based on a network metric associated with the first or second access network, a user or device activity preference associated with the first network or a user or device activity associated with the first or second packet flow. Further, each access network is operable to enable the network node associated with the first network to access the second network over the corresponding access node.

In one exemplary embodiment, a method is performed by a network node associated with a second network that is operatively coupled to network nodes associated with first and second access networks and to a network node associated with a first network. The method includes sending, to the network node associated with the first network, an indication of a network metric associated with the first or second access network so that the network node associated with the first network is operable to selectively route packets between the first and second networks over access nodes associated with the first and second access networks based on a network metric associated with the first or second access network, a user or device activity preference associated with the first network or a user or device activity associated with the first or second packet flow. Further, each access network is operable to enable the network node associated with the first network to access the second network over the corresponding access node.

In another exemplary embodiment, the method can include receiving, by the network node associated with the second network, from a network node associated with the first access network, an indication associated with a network characteristic of the first access network.

In another exemplary embodiment, the method can include updating the network characteristic of the first access network based on the received indication.

In another exemplary embodiment, the method can include receiving, by the network node associated with the second network, from a network node associated with the second access network, an indication associated with a network characteristic of the second access network.

In another exemplary embodiment, the method can include updating the network characteristic of the second access network based on the received indication.

In another exemplary embodiment, the method can include determining the network metric associated with the first or second access network based on the network characteristic of the first or second access network.

In one exemplary embodiment, a network node is associated with a second network and includes processing circuitry and a memory with the memory comprising instructions executable by the processing circuitry whereby the processing circuitry is configured to send, to a network node associated with a first network, an indication of a network metric of a first or second access network so that the network node associated with the first network is operable to selectively route packets between the first and second networks over an access node of the first access network and an access node of a second access network based on the network metric of the first or second access network, a user or device activity preference associated with the first network or a user or device activity associated with the first or second packet flow. Further. each access network is operable to enable the network node associated with the first network to access the second network over the corresponding access node.

In one exemplary embodiment, a method is performed by a network node associated with a first access network. The method includes sending, to a network node associated with a second network, an indication associated with a network characteristic of the first access network so that a network node associated with a first network is operable to selectively route packets between the first and second networks over an access node of the first access network and an access node of a second access network based on the network characteristic of the first access network, a user or device activity preference associated with the first network or a user or device activity associated with the first or second packet flow. Further, each access network is operable to enable the network node associated with the first network to access the second network over the corresponding access node.

In one exemplary embodiment, a network node is associated with a first access network and includes processing circuitry and a memory with the memory comprising instructions executable by the processing circuitry whereby the processing circuitry is configured to send, to a network node associated with a second network, an indication of a network characteristic associated with the first access network so that a network node associated with a first network is operable to selectively route packets between the first and second networks over an access node of the first access network and an access node of a second access network based on the network characteristic of the first access network, a user or device activity preference associated with the first network or a user or device activity associated with the first or second packet flow. Further, each access network is operable to enable the network node associated with the first network to access the second network over the corresponding access node.

The previous detailed description is merely illustrative in nature and is not intended to limit the present disclosure, or the application and uses of the present disclosure. Furthermore, there is no intention to be bound by any expressed or implied theory presented in the preceding field of use, background, summary, or detailed description. The present disclosure provides various examples, embodiments and the like, which may be described herein in terms of functional or logical block elements. The various aspects described herein are presented as methods, devices (or apparatus), systems, or articles of manufacture that may include a number of components, elements, members, modules, nodes, peripherals, or the like. Further, these methods, devices, systems, or articles of manufacture may include or not include additional components, elements, members, modules, nodes, peripherals, or the like.

Furthermore. the various aspects described herein may be implemented using standard programming or engineering techniques to produce software, firmware, hardware (e.g., circuits), or any combination thereof to control a computing device to implement the disclosed subject matter. It will be appreciated that some embodiments may be comprised of one or more generic or specialized processors such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the methods, devices and systems described herein. Alternatively, some or all functions could be implemented by a state machine that has no stored program instructions, or in one or more application specific integrated circuits (ASICs), in which each function or some combinations of certain of the functions are implemented as custom logic circuits, Of course, a combination of the two approaches may be used. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The term "article of manufacture" as used herein is intended to encompass a computer program accessible from any computing device, carrier, or media. For example, a computer-readable medium may include: a magnetic storage device such as a hard disk, a floppy disk or a magnetic strip; an optical disk such as a compact disk (CD) or digital versatile disk (DVD); a smart card; and a flash memory device such as a card, stick or key drive. Additionally, it should be appreciated that a carrier wave may be employed to carry computer-readable electronic data including those used in transmitting and receiving electronic data such as electronic mail (e-mail) or in accessing a computer network such as the Internet or a local area network (LAN). Of course, a person of ordinary skill in the art will recognize many modifications may be made to this configuration without departing from the scope or spirit of the subject matter of this disclosure.

Throughout the specification and the embodiments. the following terms take at least the meanings explicitly associated herein, unless the context clearly dictates otherwise. Relational terms such as "first" and "second," and the like may be used solely to distinguish one entity or action from another entity or action without necessarily requiring or implying any actual such relationship or order between such entities or actions. The term "or" is intended to mean an inclusive "or" unless specified otherwise or clear from the context to be directed to an exclusive form. Further, the terms "a," "an," and "the" are intended to mean one or more unless specified otherwise or clear from the context to be directed to a singular form. The term Include" and its various forms are intended to mean including but not limited to. References to one embodiment," "an embodiment," "example embodiment," "various embodiments," and other like terms indicate that the embodiments of the disclosed technology so described may include a particular function, feature, structure, or characteristic, but not every embodiment necessarily includes the particular function, feature, structure, or characteristic. Further, repeated use of the phrase "in one embodiment" does not necessarily refer to the same embodiment, although it may. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. A device or structure that is "configured" in a certain way is configured in at least that way, but may also be configured in ways that are not listed.

What is claimed is:

1. A method, comprising:
   by a first network node associated with a first network configured as a local area network and operable to selectively route packet flows between the first network and a second network configured as a wide area network over a first access node of a first access network associated with a first internet service provider and a second access node of a second access network associated with a second internet service provider, contemporaneously routing both a first packet flow to the first access node and a second packet flow to the second access node based on a network metric associated with the first or second access network, a user activity preference associated with the first network and a user activity associated with the first or second packet flow for which the first network node is operable to determine the user activity based on at least one packet of the first or second packet flow, each access network being operable to enable the first network node to access the second network over the corresponding access node.

2. The method of claim 1, further comprising:
   receiving, by the first network node, one or more packets associated with the first packet flow.

3. The method of claim 2, further comprising:
   determining that the first packet flow is associated with a first user activity based on the one or more packets associated with the first packet flow.

4. The method of claim 3, further comprising:
   receiving, by the first network node, one or more packets associated with the second packet flow.

5. The method of claim 4, further comprising:
   determining that the second packet flow is associated with a second user activity based on the one or more packets associated with the second packet flow.

6. The method of claim 1, further comprising:
   determining to route the first packet flow to the first access node of the first access network based on the network metric associated with the first or second access network, the user activity preference associated with the first network, and the user activity associated with the first or second packet flow.

7. The method of claim 1, further comprising:
   determining to route the second packet flow to the second access node of the second access network based on the network metric associated with the first or second access network, the user activity preference associated with the first network, and the user activity associated with the first or second packet flow.

8. The method of claim 1, further comprising:
receiving, by the first network node over the first or second access network, from a network node associated with the second network, an indication of the network metric associated with the first or second access network.

9. The method of claim 8, further comprising:
updating the network metric associated with the first or second access network based on the network metric indication.

10. The method of claim 1, further comprising:
receiving, by the first network node, from a second network node associated with the first network, an indication of a user activity preference associated with the first network.

11. The method of claim 10, further comprising:
updating the user activity preference based on the user activity preference indication.

12. The method of claim 1, further comprising:
determining a network characteristic associated with the first network; and
sending, by the first network node over the first or second access networks, to a network node associated with the second network, an indication of a network characteristic associated with the first network.

13. The method of claim 12, further comprising:
determining a network characteristic associated with the second network; and
sending, by the first network node over the first or second access networks, to a network node associated with the second network, an indication of a network characteristic associated with the second network.

14. The method of claim 1, wherein the first and second access networks are heterogeneous networks and the first network node includes first and second transceivers with the first transceiver being operable to wirelessly communicate with the first access node of the first access network associated with a first Internet service provider and the second transceiver being operable to wirelessly communicate with the second access node of the second access network associated with a second Internet service provider.

15. A first network node associated with a first network, comprising:
processing circuitry and a memory, the memory comprising instructions executable by the processing circuitry whereby the processing circuitry is configured to:
contemporaneously route a first packet flow to a first access node associated with a first access network associated with a first internet service provider and a second packet flow to a second access node associated with a second access network associated with a second internet service provider based on a network metric associated with the first or second access network, a user activity preference associated with the first network and a user activity associated with the first or second packet flow for which the first network node is operable to determine the user activity based on at least one packet of the first or second packet flow, with the first network node being configured as a local area network and operable to selectively route packets between the first network and a second network configured as a wide area network over the first and second access nodes, each access network being operable to enable the first network node to access the second network over the corresponding access node.

16. The system of claim 15, wherein the memory includes further instructions executable by the processing circuitry whereby the processing circuitry is configured to:
receive one or more packets associated with the first packet flow;
determine that the first packet flow is associated with a first user activity based on the one or more packets associated with the first packet flow;
receive one or more packets associated with the second packet flow; and
determine that the second packet flow is associated with a second user activity based on the one or more packets associated with the second packet flow.

17. The system of claim 16, wherein the memory includes further instructions executable by the processing circuitry whereby the processing circuitry is configured to:
determine to route the first packet flow to the first access node based on the network metric associated with the first or second access network, the user activity preference associated with the first network and the user activity associated with the first or second packet flow.

18. The system of claim 17, wherein the memory includes further instructions executable by the processing circuitry whereby the processing circuitry is configured to:
determine to route the second packet flow to the second access node based on the network metric associated with the first or second access network, the user activity preference associated with the first network, and the user activity associated with the first or second packet flow.

19. The system of claim 15, wherein the memory includes further instructions executable by the processing circuitry whereby the processing circuitry is configured to:
receive, by the first network node over the first or second access network, from a network node associated with the second network, an indication of the network metric associated with the first or second access network; and
update the network metric associated with the first or second access network based on the network metric indication associated with the first or second access network.

20. The system of claim 15, wherein the memory includes further instructions executable by the processing circuitry whereby the processing circuitry is configured to:
determine a network characteristic associated with the first network; and
sending, by the first network node over the first or second access network, to a network node associated with the second network, an indication of a network characteristic associated with the first network.

\* \* \* \* \*

UNITED STATES PATENT AND TRADEMARK OFFICE
CERTIFICATE OF CORRECTION

| | |
|---|---|
| PATENT NO. | : 11,937,165 B1 |
| APPLICATION NO. | : 18/372912 |
| DATED | : March 19, 2024 |
| INVENTOR(S) | : Emilio Alvarez Flores |

It is certified that error appears in the above-identified patent and that said Letters Patent is hereby corrected as shown below:

On the Title Page

Item (71) after, "Applicant: Stackshare Technologies LLC Watertown" delete "NC" and substitute therefore --- MA ---.

Signed and Sealed this
Thirtieth Day of April, 2024

Katherine Kelly Vidal
*Director of the United States Patent and Trademark Office*